(12) United States Patent
Nakamura et al.

(10) Patent No.: US 7,647,733 B2
(45) Date of Patent: Jan. 19, 2010

(54) REINFORCING STRUCTURE FOR BUILDING

(75) Inventors: Takuzo Nakamura, Sendai (JP); Kiyotaka Nanama, Tokyo (JP); Takaaki Eguchi, Tokyo (JP)

(73) Assignee: Nakamura Bussan Co., Ltd., Sendai-shi, Miyagi (JP)

( * ) Notice: Subject to any disclaimer, the term of this patent is extended or adjusted under 35 U.S.C. 154(b) by 552 days.

(21) Appl. No.: 10/537,249

(22) PCT Filed: Dec. 2, 2003

(86) PCT No.: PCT/JP03/15380

§ 371 (c)(1), (2), (4) Date: Sep. 8, 2005

(87) PCT Pub. No.: WO2004/051015

PCT Pub. Date: Jun. 17, 2004

(65) Prior Publication Data

US 2006/0137292 A1    Jun. 29, 2006

(30) Foreign Application Priority Data

Dec. 2, 2002    (JP) .............................. 2002-350004

(51) Int. Cl.
  *E04B 1/98*  (2006.01)
  *B60G 11/34*  (2006.01)
  *F16F 1/18*  (2006.01)

(52) U.S. Cl. ....................... 52/167.1; 52/167.3; 267/30; 267/158

(58) Field of Classification Search ............... 52/167.1, 52/167.3, 167.8, 287.1, 288.1, 309.4, 309.2, 52/167.7; 403/364, 384, 389, 329; 267/151, 267/158, 160, 229, 259, 30, 36.1

See application file for complete search history.

(56) References Cited

U.S. PATENT DOCUMENTS

| 70,446 | A | * | 11/1867 | Long ............................ 267/30 |
| 1,194,069 | A | * | 8/1916 | Roberts ........................ 267/30 |
| 1,287,858 | A | * | 12/1918 | Brewster ..................... 267/30 |
| 2,058,281 | A | * | 10/1936 | Wesley ........................ 267/45 |

(Continued)

FOREIGN PATENT DOCUMENTS

JP    03-172471    7/1991

(Continued)

*Primary Examiner*—Richard E Chilcot, Jr.
*Assistant Examiner*—Brent W Herring
(74) *Attorney, Agent, or Firm*—Manabu Kanesaka

(57) ABSTRACT

A reinforcing structure for a building and a reinforcing member used for the structure, where the structure has excellent anti-vibration characteristics and quake resistance. The reinforcing structure and member for a building are capable of reducing the deformation of structural members of the building caused by vibration and removing the deformation so that the original form is restored. A reinforcing member (1) is provided and fixed at a corner portion where structural members (11, 12) of a building intersect. The reinforcing member (1) is formed such that a first spring member (third leaf 33) and a second spring member (layered leaf (5)) are combined, and a damper (4) and a synthetic resin foam body (2*a*) are arranged in a space between the first and second spring members. A synthetic resin foam body (2*b*) is filled in a space surrounded by the structural members (11, 12) and the reinforcing member (1).

6 Claims, 10 Drawing Sheets

U.S. PATENT DOCUMENTS

| | | | | |
|---|---|---|---|---|
| 2,202,786 A * | 5/1940 | Weber | | 267/30 |
| 2,580,975 A * | 1/1952 | Tea | | 267/45 |
| 2,603,014 A * | 7/1952 | Michael | | 40/624 |
| 2,826,407 A * | 3/1958 | Scheublein, Jr. et. al. | | 267/45 |
| 3,799,571 A * | 3/1974 | Sudberry | | 280/124.174 |
| 4,795,666 A * | 1/1989 | Okada et al. | | 428/71 |
| 4,922,667 A * | 5/1990 | Kobori et al. | | 52/167.2 |
| 5,027,452 A * | 7/1991 | Ramsier | | 5/136 |
| 5,257,483 A * | 11/1993 | Netek | | 52/23 |
| 6,438,905 B2 * | 8/2002 | Constantinou | | 52/167.3 |
| RE38,075 E * | 4/2003 | Thompson et al. | | 52/167.1 |
| 6,751,921 B1 * | 6/2004 | Iwakawa | | 52/713 |
| 6,925,772 B1 * | 8/2005 | Iwakawa | | 52/713 |
| 6,931,799 B2 * | 8/2005 | Webb | | 52/167.1 |
| 6,971,623 B2 * | 12/2005 | Allmon et al. | | 248/680 |
| 7,137,227 B2 * | 11/2006 | Franz | | 52/243.1 |
| 2001/0045069 A1 * | 11/2001 | Constantinou | | 52/167.3 |
| 2002/0100229 A1 * | 8/2002 | Chen et al. | | 52/167.1 |
| 2004/0020140 A1 * | 2/2004 | Allmon et al. | | 52/167.1 |
| 2005/0005539 A1 * | 1/2005 | Nakamura et al. | | 52/167.3 |
| 2005/0166487 A1 * | 8/2005 | Tsai | | 52/167.3 |

FOREIGN PATENT DOCUMENTS

JP      2001-200590      7/2001

* cited by examiner

REINFORCING STRUCTURE FOR BUILDING

RELATED APPLICATIONS

The present application is based on International Application No. PCT/JP2003/015380 filed Dec. 2, 2003, and claims priority from, Japanese Application Number 2002-350004, filed Dec. 2, 2002, the disclosure of which is hereby incorporated by reference herein in its entirety.

TECHNICAL FIELD

The present invention relates to a reinforcing structure for a building or construction which has reinforced anti-vibration properties and quake resistance.

BACKGROUND ART

Reinforced structures are known which bridge across reinforced members, such as bracing and diagonal bracing between two mutually contacting structural members such as posts, studs, ground sills, beams, and girths in wooded post and beam buildings, lumber in wood frame construction buildings, and steel beams in steel frame buildings. For instance, as shown in FIG. 10, reinforcing structures are known where reinforced wood or metal members 103 such as horizontal angle braces bridge across one structural member 101 and another structural member 102, and both ends of these reinforced members 103 are fixed to the structural members 101, 102 to reinforce the building.

Buildings which have these reinforcing structures have better quake resistance than building structures which do not have reinforcing members installed.

In order to further increase quake resistance performance using an anti-vibrational structure in buildings using reinforced structures, Japanese Patent Applications 2001-287022 and 2001-287023 have been proposed.

The reinforcing structure of the invention according to Japanese Patent Application 2001-287022 is made by fixing a reinforcing member made from spring steel between one structural member and another structural member. Furthermore, the reinforcing structure of the invention according to Japanese Patent Application 2001-287023 is made by fixing a reinforcing member between one structural member and another structural member, and synthetic resin foam is fixed in compression in the space formed between the structural members and the reinforcing members.

Reinforcing structures according to the above invention are one type of flexible quake resistance reinforcing structure, and the reinforcing members made from spring steel or synthetic resin foam can absorb the structural member deformation energy when the building vibrates and the structural members deform because of earthquakes, traffic vibration, or strong winds or the like, reducing twisting deformation or the like, and increasing the durability of the building.

The reinforcing structures of the aforementioned Patent Applications 2001-287022 and 2001-287023 can absorb the structural member deformation energy, but if the vibration and shaking applied to the building is too large, the damping effect which reduces the structural member deformation will be insufficient, and the recovery forces for suppressing deformation and recovering to the proper position will also be insufficient.

An objective of the present invention is to provide a reinforcing structure for buildings which can favorably absorb and dampen vibration energy when a building vibrates because of earthquakes, traffic vibration, and strong winds or the like, suppress structural member deformation of the building caused by vibration, quickly relieve structural member deformation, and restore the structural member to the original condition.

Furthermore, another objective of the present invention is to provide a reinforcing member for buildings which has excellent energy damping effect and excellent recovery force for structural member deformation.

DISCLOSURE OF THE INVENTION

The present invention is a reinforcing structure for buildings, wherein a reinforcing member which comprises a plurality of spring members and has a space formed between these spring members is bridged over and fixed to one structural member and another structural member of the building.

Furthermore, the present invention is a reinforcing member for buildings which is bridged over and fixed to one structural member and another structural member of the building, and comprises of a plurality of spring members, wherein a space is formed between the spring members.

The reinforcing member is a combination of a first spring member and a second spring member which have curved shapes, and is constructed such that a space is formed between the two spring members. The first spring member is comprised of a plate spring, and the second spring member is constructed as a leaf spring comprising two overlapping plate springs joined with a retaining clip.

A damper member and a synthetic resin foam are established in the space between the spring members, but it is also acceptable for only the damper member or only the synthetic resin foam to be established in this space.

The building reinforcing structure of the present invention provides a synthetic resin foam in the space enclosed by the structural members and the reinforcing member, and is constructed to move in conjunction with the reinforcing member and the synthetic resin foam and have a energy damping effect.

With the building reinforcing structure of the present invention, vibrational energy will be sufficiently absorbed and excellent energy damping effect will be observed when the building vibrates because of an earthquake or traffic vibration or the like. With the present invention, energy can favorably be damped not only when the structural members receive a force in the compressive direction, but also when a force is received in the tensile direction, and therefore an excellent vibration suppressing structure can be obtained.

With the present invention, not only can be vibration energy be favorably damped, but deformation of the building can quickly be returned to normal, and therefore shaking of the building will be minimized and can be restricted to a short period of time.

The present invention has advantages in that the durability of the structure member will be high, maintenance is not necessary, the cost is inexpensive, and installation of the reinforcing member between structural members is simple.

BEST MODE FOR CARRYING OUT THE INVENTION

Figure 1:
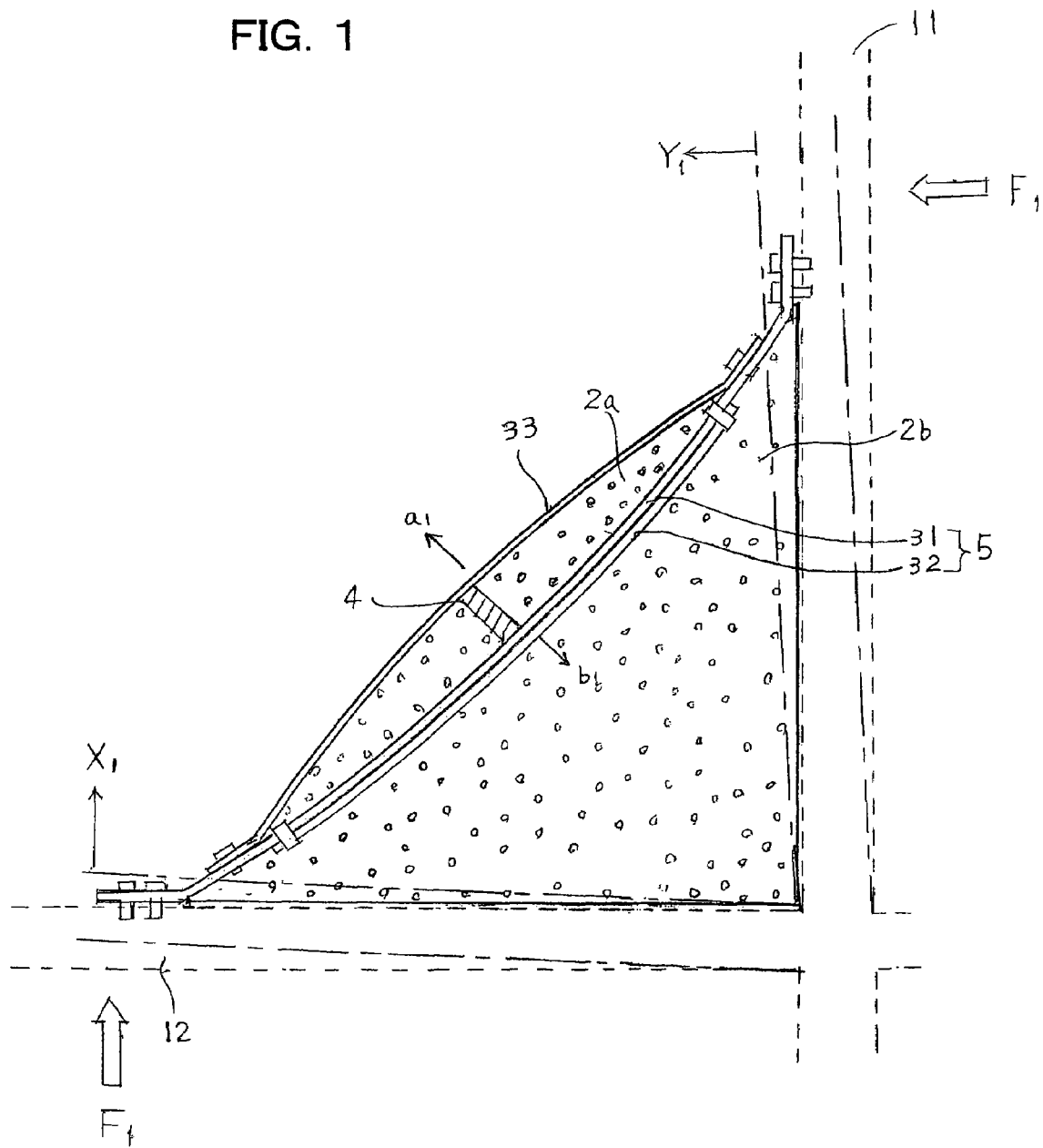
FIG. 1 is a side surface view showing an embodiment of the building reinforcing structure of the present invention.

FIG. 1 shows an embodiment of a building reinforcing structure of the present invention. This building has structural member 11 and structural member 12 which are assembled to intersect with each other, and one structural member 11 is constructed as a post for instance, and the other structural member 12 is constructed as a beam for instance. The building reinforcing structure of the present invention has a reinforcing member 1 which is bridged over and fixed to the two structural members 11, 12 at the corner where the two structural members 11, 12 intersect or at the corner where the two structural members 11, 12 contact.

Reinforcing member 1 comprises a first spring member and a second spring member, both spring members are connected near the ends, and a space is formed between both spring members. Metal plate springs may be used as these spring members. Furthermore, it is acceptable for the first spring member and the second spring member to be made from a single plate spring, or they may be made as a leaf spring made by overlapping a plurality of plate springs. With the reinforcing member 1 shown in FIG. 1, the first plate spring is made from a single plate spring, and the second plate spring is formed as a leaf spring made from overlapping 2 plate springs.

In FIG. 1, reinforcing member 1 comprises three plate springs, a first leaf 31, a second leaf 32, and a third leaf 33. The first leaf 31 and the second leaf 32 are established in a mutually overlapping condition, and form a leaf spring 5. This leaf spring 5 corresponds to the aforementioned second spring member, and the third leaf 33 corresponds to the aforementioned first spring member.

The first leaf 31, second leaf 32, and third leaf 33 have the capability to absorb compression forces and tensile forces which occur between the structural member 11 and a structural member 12.

The aforementioned compression forces refer to forces applied to the reinforcing member when the structure in the region where structural member 11 and structural member 12 intersect is deformed to form an angle smaller than 90°. Furthermore, the aforementioned tensile forces refers to forces applied to the reinforcing member when the structure in the region where structural member 11 and structure member 12 intersect is deformed to form an angle larger than 90°.

With the present invention, when the structural member is deformed in the direction that the angle in the region where structural member 11, 12 intersect is larger than 90°, the resulting tensile direction is referred to as the tensile direction of the reinforcing member, and in the direction opposite to the tensile direction, when the structural member is deformed in the direction that the angle in the region where structural members 11, 12 intersect is smaller than 90°, the resulting compressive direction is referred to as the compressive direction of the reinforcing member.

With the reinforcing member 1, the first leaf 31 and the second leaf 32 are mutually overlapping and form the leaf spring 5, and both ends of the second leaf 32 are joined to the first leaf 31 with a retainer 53 as a joining member. Both ends of the third leaf 33 are fastened to both ends of the aforementioned leaf spring 5 by fastening members 9.

One end of the reinforcing member 1 constructed in this manner is fastened to the structural member 11 by a bolt 6, and the other end of the reinforcing member 1 is fastened to the structural member 12 by a bolt 6.

A space is formed inside and enclosed by the structural member 11, the structural member 12, and the reinforcing member 1, and the first leaf 31 and the second leaf 32 of the reinforcing member 1 are formed in a curve to protrude toward the inside of this space (direction towards the intersecting or contacting region of structural member 11 and structural member 12), and the third leaf 33 is formed in a curve to protrude toward the outside of this space (direction opposite to the direction facing the intersecting or contacting region of structural member 11 and structural member 12). Because of this construction, a space is formed between the third leaf 33 and the leaf spring 5 (e.g. first spring member and second spring member).

With the embodiment shown in FIG. 1, the leaf spring 5 comprises 2 leafs, the first leaf 31 and the second leaf 32, but the number of plate springs which make a leaf spring 5 is not restricted in particular, and three or more plates are acceptable as well. Furthermore, the space between the third leaf 33 and the leaf spring 5 may also be formed in 2 or more locations rather than in just one location.

With the present invention, the first leaf 31, second leaf 32, and third leaf 33 which compose the reinforcing member are made from spring members, but besides the aforementioned plate springs, the type of spring member may be coil springs or torque rods. For instance, taper leaf spring may be used as the plate spring. The first leaf 31 and the second leaf 32 make up the leaf spring, but conventional springs with linear deflection properties, progressive springs which are linear characteristic springs where the spring constant is constantly changing, or nonlinear characteristic springs where the spring constant changes in two steps, or the like may be used.

A damper member 4 and a synthetic resin foam 2a are established between the third leaf 33 and the leaf spring 5 in the reinforcing member 1.

The damper member 4 is established to link between the third leaf 33 and the leaf spring 5. The damper member 4 may use a material which has a damping function such as a spring, rubber, or oil damper or the like. Springs which are used in the damper member 4 may be plate springs, coil springs, disc springs, volute springs, and wheel springs or the like.

The synthetic resin foam 2a is filled in between the third leaf 33 and the leaf spring 5.

It is also acceptable for only the damper member 4 or only the synthetic resin foam 2a to be provided between the third leaf 33 and the leaf spring 5.

The outer surface of the reinforcing member 1 is covered by a mesh material such as a carbon fiber sheet or a glass fiber sheet or the like and a penetrating material such as mortar or the like may be applied overtop so that the mesh material is formed to be combined with the reinforcing member 1. By constructing in this manner, the vibration energy damping effect of the reinforcing member 1 can be increased.

The synthetic resin foam 2b is established to fill in the space created between structural member 11, structural member 12, and the reinforcing member 1. The mutually contacting surfaces between the synthetic resin foam 2b and structural member 11 and the mutually contacting surfaces between the synthetic resin foam 2b and the structural member 12 as well as the mutually contacting surfaces between the synthetic resin foam 2b and the leaf spring 5 of the reinforcing member 1 are preferably adhered together. In order to accomplish this, adhesive is normally used, but fastening by adhesive tape is also possible. If the mutually contacting surfaces between the synthetic resin foam 2b and the leaf spring 5 are adhered, thermal adhesion can be performed, and in this case, a direct sheet adhesive may be used, but the thermal adhesion may also be performed by a thermal adhesive resin.

It is also possible to attach the leaf spring 5 and the synthetic resin foam 2b beforehand to make a single piece. With this type of construction, the operation of attaching the reinforcing member between the structural members 11 and 12 will be simple.

In reinforcing member 1, the synthetic resin foam 2b established in the space between the damper member 4, the synthetic resin foam member 2a, the reinforcing member 1, and the structural member 11, 12, moves in conjunction with the plate springs (third leaf 33, leaf spring 5) in the reinforcing member 1 to absorb vibration energy and have a damping effect when an external force is applied by vibration to the structural members 11, 12.

The resin material of the synthetic resin foams 2a, 2b may use a polystyrene resin which has a styrene component ratio no less than 50 wt. % or a polystyrene resin composition, such as styrene monopolymer resin, styrene copolymer resin made from styrene and another monomer, a mixture of styrene monopolymer resin and/or styrene copolymer resin and styrene-butadiene block copolymer, rubberized styrene resin (impact resistant polystyrene) made by polymerizing styrene monomer in the presence of a rubber polymer, or a mixture of the aforementioned styrene resin with other resin and/or rubber polymer; a polyethylene resin which has an ethylene component ratio no less then 50 wt. % or a polyethylene resin composition, such as ethylene monomer resin, and ethylene copolymer resin made from ethylene and other monomer, grafted ethylene resin made by impregnating a vinyl monomer such as a styrene monomer into an ethylene monopolymer resin and/or an ethylene copolymer resin and then polymerizing, or a mixture of the aforementioned ethylene resin and other resin and/or rubber polymer; a polypropylene resin which has a propylene component ratio no less then 50 wt. % or a polypropylene resin composition, such as propylene monomer resin, and propylene copolymer resin made from propylene and other monomer, grafted propylene resin made by impregnating a vinyl monomer such as a styrene monomer into a propylene monopolymer resin and/or a propylene copolymer resin and then polymerizing, or a mixture of the aforementioned propylene resin and other resin and/or rubber polymer; thermoplastic polyester resin; polycarbonate resin; polyamide resin; polyphenylene ether resin; or mixtures of two or more of the aforementioned resins.

The manufacturing method for obtaining the synthetic resin foam may be any publicly known synthetic resin foaming method used in the past.

Figure 2:
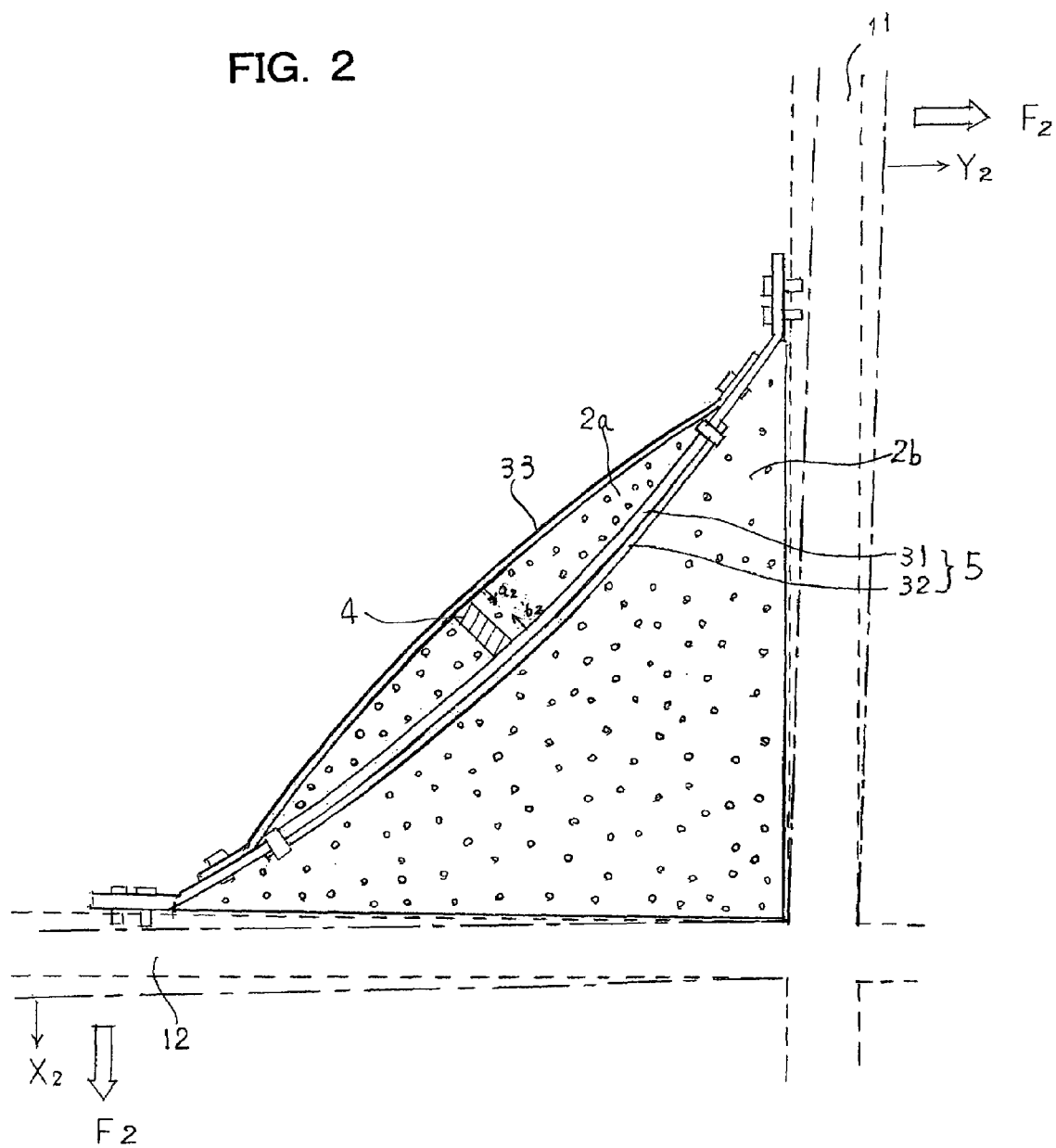
FIG. 2 is a side surface view showing another embodiment of a reinforcing structure of the present invention.

FIG. 2 shows another embodiment of the building reinforcing structure of the present invention, and the reinforcing member 1 used in the reinforcing structure of this embodiment has a first leaf 31 made from a plate spring curved to protrude into the space created by the structural members 11, 12 and the reinforcing member 1, and a second leaf 32 made from a plate spring which has a wave form in the longitudinal direction, and both ends of these leafs are connected to form one piece.

A space is formed between the first leaf 31 and a second leaf 32, and the synthetic resin foam 2a is filled in to the space. Furthermore, synthetic resin foam 2b is filled into the space between the structural members 11, 12 and the first leaf 31.

Figure 3:
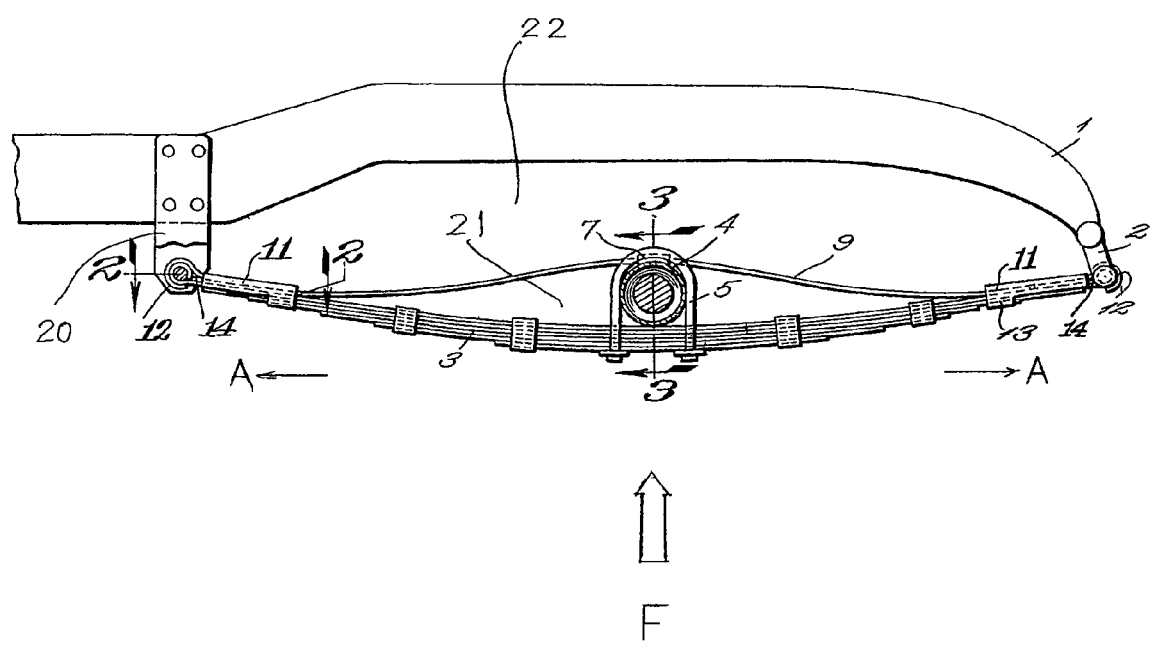
FIG. 3 is a side surface view showing another embodiment of a reinforcing structure of the present invention.

The reinforcing member 1 shown in FIG. 3 has a first leaf 31 made from a plate spring curved to protrude into the space created by structural members 11, 12 and reinforcing member 1, and the second leaf 32 made from a plate spring which is formed to be slightly concave in the longitudinal middle into the aforementioned space, and both ends of these leafs are connected to form one piece.

A space is formed between the first leaf 31 and the second leaf 32, and a damper member 4 formed from spring steel is connected to and mounted on the first leaf 31 in this space. The damper member 4 is spring steel which is curved to protrude toward the second leaf 32 side, and the tip of the protrusion contacts the second leaf 32 near the center, and both ends are fastened to the first leaf 31 to form one piece.

Synthetic resin foam 2a is filled in between the first leaf 31 and the second leaf 32 (except in the space between the first leaf 31 and the damper member 4). Furthermore, the space between structural members 11, 12 and the first leaf 31 is filled with synthetic resin foam 2b.

Figure 4:
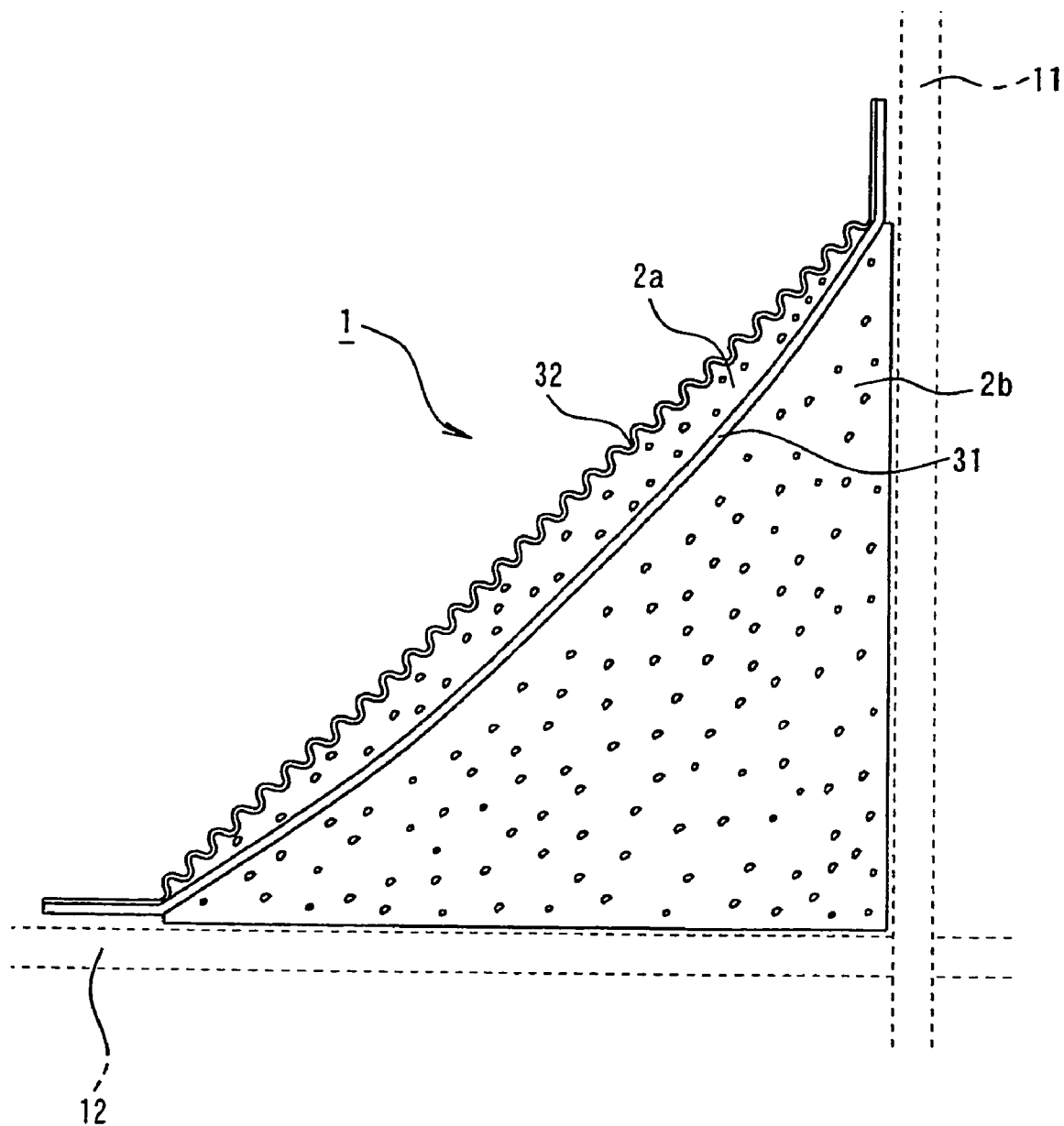
FIG. 4 is a side surface view showing another embodiment of a reinforcing structure of the present invention.

The reinforcing member 1 shown in FIG. 4 has a first leaf 31 made from a plate spring which is curved to protrude in to the space created by the structural members 11, 12 and the reinforcing member 1, and a second leaf 32 made from a corrugated plate spring which has a plurality of waves formed in the longitudinal direction, and both ends of the leafs are connected to form a single piece. A space is formed between the first leaf 31 and the second leaf 32, and synthetic resin foam 2a is filled into this space, and synthetic resin foam 2b is filled into the space between structural members 11, 12 and the first leaf 31.

Figure 5:
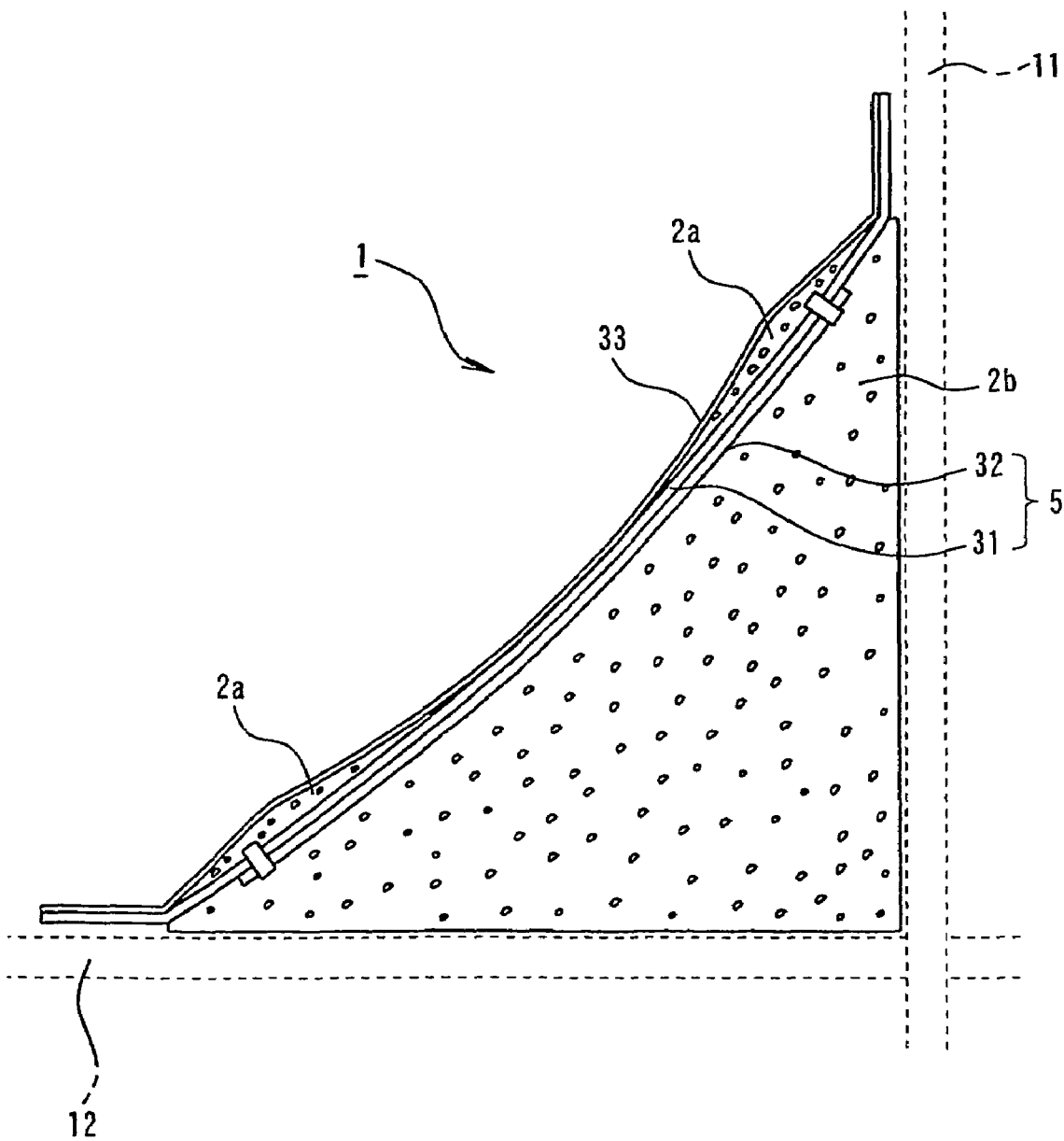
FIG. 5 is a side surface view showing another embodiment of a reinforcing structure of the present invention.

The reinforcing member 1 shown in FIG. 5 comprises a third leaf 33 and a leaf spring 5 which has overlapping layers of a first leaf 31 and a second leaf 32. The leaf spring 5 is formed in a curve which protrudes in to the space created by the structural members 11, 12 and the reinforcing member 1. The third leaf 33 is formed in a curve which protrudes inward to the aforementioned space except in the area around both ends, and the region at both ends is formed to be straight. The region which is formed to be curved contacts the second leaf 32 near the center. With this type of structure, a space is formed between a first leaf 31 and a third leaf 33 at both ends of the reinforcing member 1. Synthetic resin foam 2a is filled into this space. Furthermore, synthetic resin foam 2b is filled into the space between the structural members 11, 12 and the reinforcing member 1.

Figure 6A:
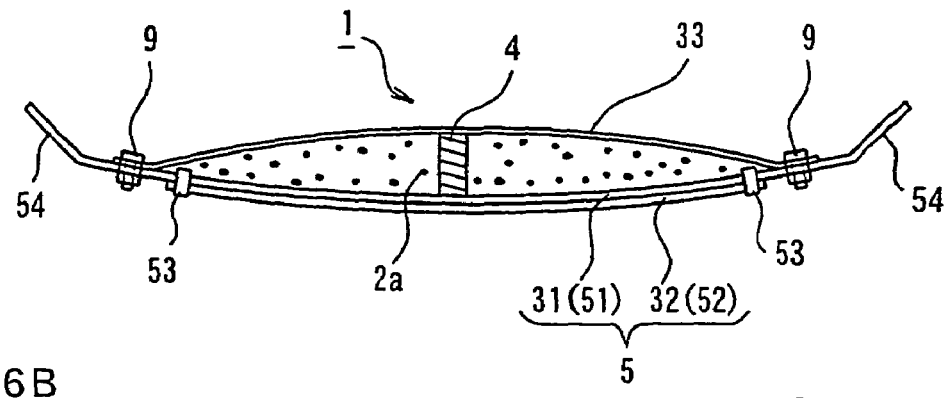
FIG. 6A is a side surface view showing an embodiment of a reinforcing member.
Figure 6B:
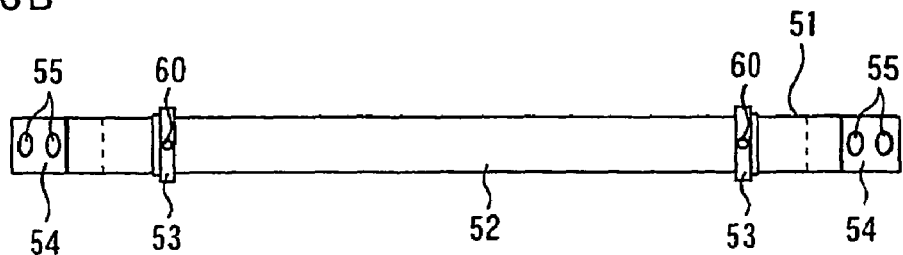
FIG. 6B is a bottom surface view of the same.

As shown in FIG. 6A, reinforcing member 1 is formed as a unit comprising a leaf spring 5 made by overlapping a first leaf 31 (main plate spring 51) and a second leaf 32 (subordinate plate spring 52), a third leaf 33, a damper member 4, and a synthetic resin foam 2a. The third leaf 33 is formed with a length that is slightly shorter than the leaf spring 5, and both ends are fastened to the leaf spring 5 by fastening members 9. The fastening members 9 may be bolts or rivets or the like.

Fastening part 54 is formed on both ends of the main plate spring 51 in order to fasten the reinforcing member 1 to the structural members 11, 12. A bolt hole 55 is established in the fastening part 54.

The subordinate plate spring 52 (second leaf 32) is formed with a length that is shorter than the main plate spring 51 (first leaf 31) and overlaps the main plate spring 51. A retainer 53 is attached near both the longitudinal ends of the subordinate plate spring 52, and the main plate spring 51 and the subordinate plate spring 52 are connected by this retainer 53.

Figure 6C:
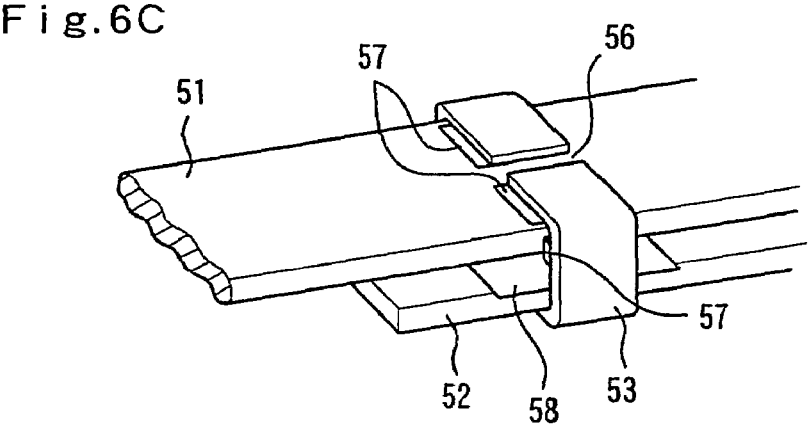
FIG. 6C is a partial perspective view showing the leaf spring of the reinforcing member.

FIG. 6C shows the condition where a sheet like member is wrapped around the overlapping main plate spring 51 and subordinate plate spring 52 leaving a space 56. This wrapped around sheet like member corresponds to retainer 53. Fastening pins 60 are inserted into insert holes 8 established in the bottom of the retainer 53, and these fastening pins 60 press against the bottom surface of the subordinate plate spring 52, and the subordinate plate spring 52 and the retainer 53 are connected together by these fastening pins 60. Holes for fastening the fastening pins 60 to the bottom surface of the subordinate plate spring 52 can also be provided.

In the condition where main plate spring 51 and subordinate plate spring 52 are attached to retainer 53, the mutually contacting surfaces of the main plate spring 51 and the subordinate plate spring 52 are able to slide, and the mutually contacting surfaces of the main plate spring 51 and the retainer 53 are also able to slide.

Figure 6D:
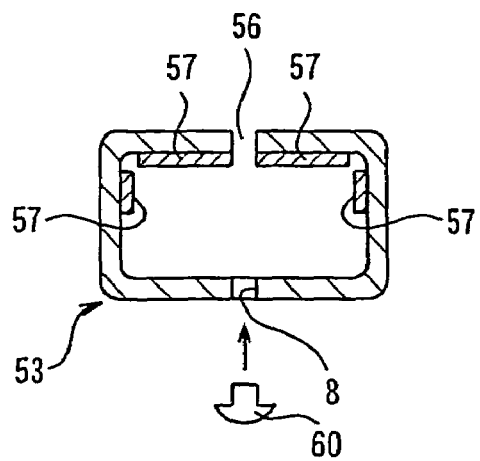
FIG. 6D is a front view showing the retaining clip which is mounted on a leaf spring.

A sliding friction resistance material 57 is attached to the mutually contacting surfaces of the main plate spring 51 and the retainer 53. This sliding friction resistance material 57 is established on the inside top surface and the upper inner side surface of the retainer 53 as shown in FIG. 6D.

Figure 6E:
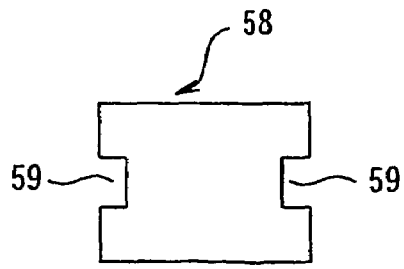
FIG. 6E is a planar view of a slide friction resistance material.

Furthermore, sliding friction resistance material 58 is also attached to the mutually contacting surfaces of the main plate spring 51 and the subordinate plate spring 52. This sliding friction resistance material 58 may be attached to any arbitrary position, and for instance, as shown in FIG. 6C, may be attached between the main plate spring 51 and the subordinate plate spring 52 in the region where the retainer 53 is attached. Retainer 53 is established to contact at least one surface of either the main plate spring 51 or the subordinate plate spring 52. The sliding friction resistance material 58 is formed to be slightly wider than the plate springs 51, 52, and as shown in FIG. 6E, a cutaway region 59 is established in both ends in order to lock into the side region of the retainer 53.

The sliding friction resistance materials 57, 58 are formed from materials which provide a sliding friction resistance, and are preferably made from material which also has a vibration absorbing effect. Examples of materials for the sliding friction resistance material include rubber, soft steel, copper, aluminum, or foam metals or the like.

When vibration occurs in the building, the first minute deformation forces are received by the main plate spring 51, and following large deformation forces are received by both the main plate spring 51 and the subordinate plate spring 52.

Each of the plate springs, namely the first leaf 31 (main plate spring 51), second leaf 32 (subordinate plate spring 52), and the third leaf 33, preferably use spring steel which is light and has high strength. Plate springs made from spring steel can be directly thermal bonded to any synthetic resin foam made from polypropylene resin or the like. Note, strong plastics may also be used as the material for the aforementioned plate springs.

The spring steel used for the plate springs can use a steel as specified in JIS G4801. The plate springs made from spring steel have high recovery forces so if the plate spring is deformed in either the compressive direction or the tensile direction because of vibration, the plate spring will be able to promptly return to the original condition. As a result, rocking of the building will be quickly suppressed, warping will not easily occur, and the durability can be increased. The leaf spring which comprises a plurality of overlaid plate springs has the advantage of having excellent energy absorbing properties towards large stresses.

In the leaf spring 5, a plurality of types of subordinate plate springs 52 should preferably be prepared which have different spring forces with the same main plate spring 51. By having this type of construction, the subordinate plate spring 52 to be combined with the main plate spring 51 can suitably be selected depending on the level of reinforcement for the building, and therefore the overall spring strain can be adjusted so it is not necessary to prepare different types of reinforcing members.

The form of the leaf spring 5 shown in FIG. 1 and FIG. 6A is constructed by overlapping two plate springs, but the number of plate springs which make up the leaf spring 5 is not restricted in particular, and the leaf spring 5 may also be comprising three or more plate springs.

With the reinforcing structure shown in FIG. 1, synthetic resin foam 2b completely fills the near triangular space formed and enclosed by the structural members 11, 12 and the reinforcing member 1, but the present invention is not restricted to this type of condition, and it is also acceptable for the synthetic resin foam 2b to partially fill the aforementioned space. In other words, the fill condition and the shape of the synthetic resin foam 2b is not restricted in particular, so long as energy in the compressive direction can be absorbed by the elastic deformation of the synthetic resin foam 2b when compressive stress from the structural members 11, 12 is received by the reinforcing member 1.

Furthermore, the material which fills the aforementioned space is not restricted to synthetic resin foam, and materials other than synthetic resin foam may be used if the material is able to absorb compressive energy and can deform when stress is applied between structural members 11, 12. Examples of these materials include non-foam synthetic resins, rubber, and soft metals or the like.

The thickness of the synthetic resin foam 2b which is filled in between the structural members 11, 12 and the reinforcing member 1 thickness is suitably selected depending on the structure of the building, but the thickness is preferably between 20% and 100% of the thickness of the structural members 11, 12, and a range of 50 mm to 200 mm is preferable.

The synthetic resin foam 2b may fill the near triangular space in a compressed manner. In order to attach the synthetic resin foam 2b in to the aforementioned space in a compressive condition, the area of the synthetic resin foam is formed to be larger than the area of the aforementioned space. The synthetic resin foam can be filled into the aforementioned space in a compressive condition by positioning the synthetic resin foam in the aforementioned space and then pressing in the leaf spring 5 from above and fastening to the structural members 11, 12.

By filling the aforementioned space with the synthetic resin foam 2b in a compressive condition, the effect of absorbing vibrational energy by the reinforcing member 1 when the building is vibrated can be further increased. Furthermore another advantage is that, for the case of a wooden building structure, if the wooden members such as posts and beams or the like which are the structural members become smaller because of changes over the years, the synthetic resin foam 2b which has been compressively filled will expand in volume because of recovery forces, and therefore a space will not occur between the structural members and the synthetic resin foam 2b.

Synthetic resin foams 2b which can compressively deform preferably have a compressive stress in the range of 50 kPa to 2000 kPa when at 5% compression, and a range of 80 kPa to 1500 kPa is more preferable. If the compressive stress is less than 50 kPa at 5% compression, sufficient vibrational energy dampening effect will not be obtained.

Furthermore, in order for the synthetic resin foam 2b to remain filled in a compressive condition in the near triangular space over a long period of time, the permanent compressive strain thereof is preferably no greater than 12%, and more preferably no greater than 10%.

The permanent compressive strain of the aforementioned synthetic resin foam is a value measured in accordance with JIS K 6767-1977. However, the compression speed when the compression is 25% of the thickness of the test sample is 10 mm/minute. Furthermore, the compressive stress at the aforementioned 5% compression is obtained from the compressive stress—strain curves obtained by compressing a test piece 10% of the original thickness in accordance with the compression hardness measuring method in JIS 6767-1977.

Polypropylene resin (including polypropylene resin composition) foams are lightweight and achieving a compressive stress and compressive permanent strain within the aforementioned the specified value range at a compression of 5% is easily accomplished, so these materials are one of the most preferred materials for the compression deformable synthetic resin foams. Polypropylene resin foams which have a compressive stress and compressive permanent strain within the designated range at 5% compression preferably have a foam ratio between 5 times and 30 times.

Figure 7:
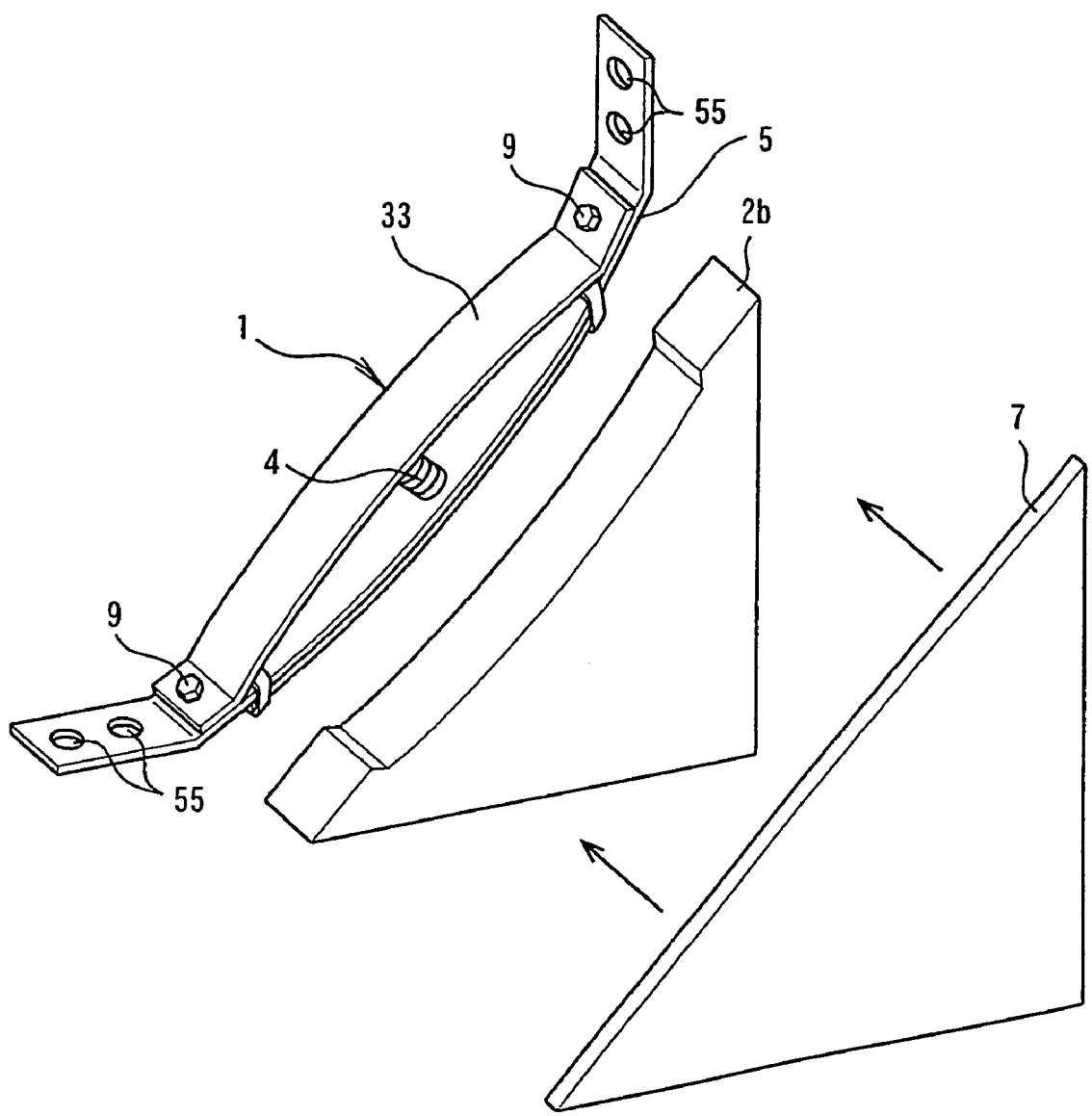
FIG. 7 is an exploded perspective view showing another embodiment of the reinforcing structure of the present invention.

With the building reinforcing structures shown in FIG. 1, a side surface plate 7 can be attached as shown in FIG. 7 so as to cover the side surface of the reinforcing member 1 and the synthetic resin foam 2b. The side surface plate 7 may be a metal plate such as steel, copper, or stainless steel plate or the like.

The side surface plate 7 is fastened to the structural members 11, 12 or the reinforcing member 1. The side surface plate 7 may be attached to both the left and right side surfaces of the reinforcing member 1 and the synthetic resin foam 2b, or may be attached to only one side surface. By attaching the side surface plate 7, the framed structure of the building can be reinforced and the effect of suppressing deformation of the building because of vibration can be increased.

Figure 8:
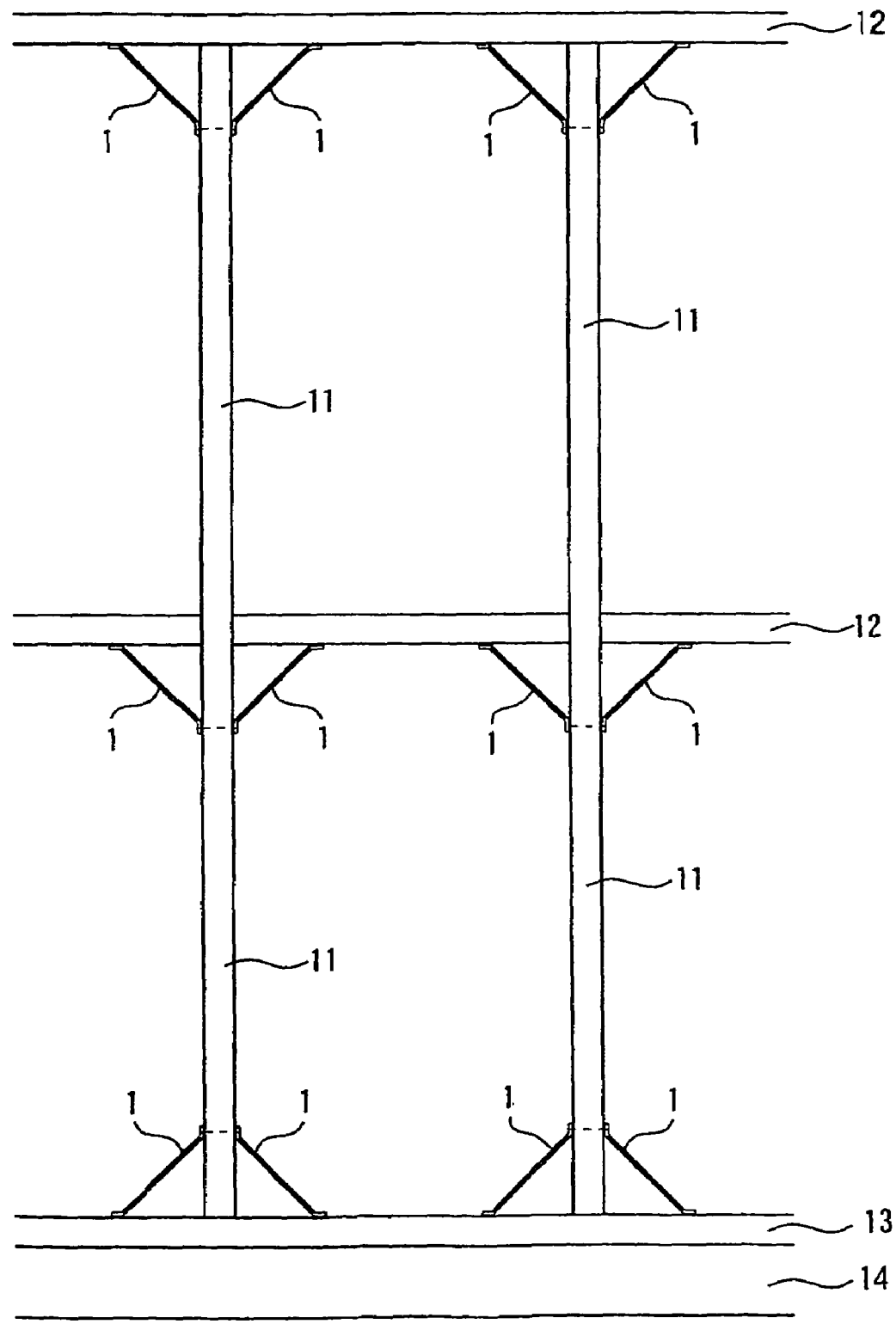
FIG. 8 is a front view of a frame structure showing the form of the reinforcing structure of the present invention established between the structural members.

As shown in FIG. 8, in addition to being established in and bridging over a corner between a post which is one structural member 11 of the building and a beam which is the other structural member 12, the reinforcing member 1 of the present invention is established and bridged over corners between a post (structural member 11) and a ground sill 13 which is established on top of the foundation 14 of the building. In either case, the reinforcing member 1 is fastened between the structural members 11, 12 or between the structural member 11 and the ground sill 13 by fastening apparatus such as bolts or the like.

Figure 9:
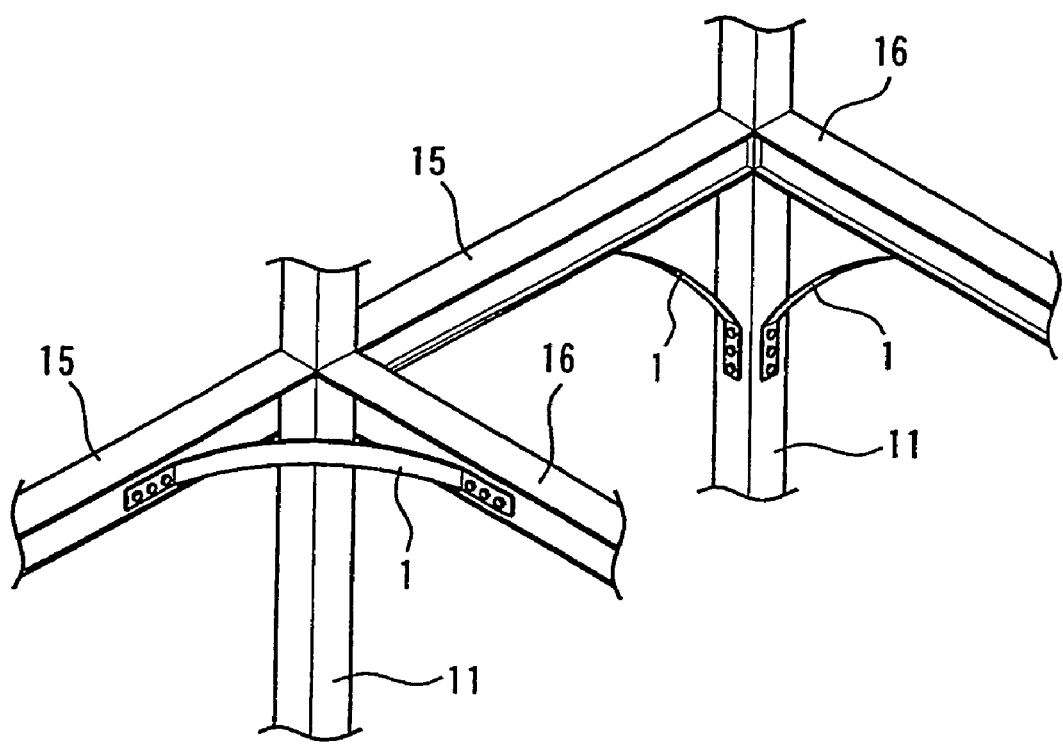
FIG. 9 is a perspective view of a frame structure showing the form of the reinforcing structure of the present intention established between structural members.
Figure 10:
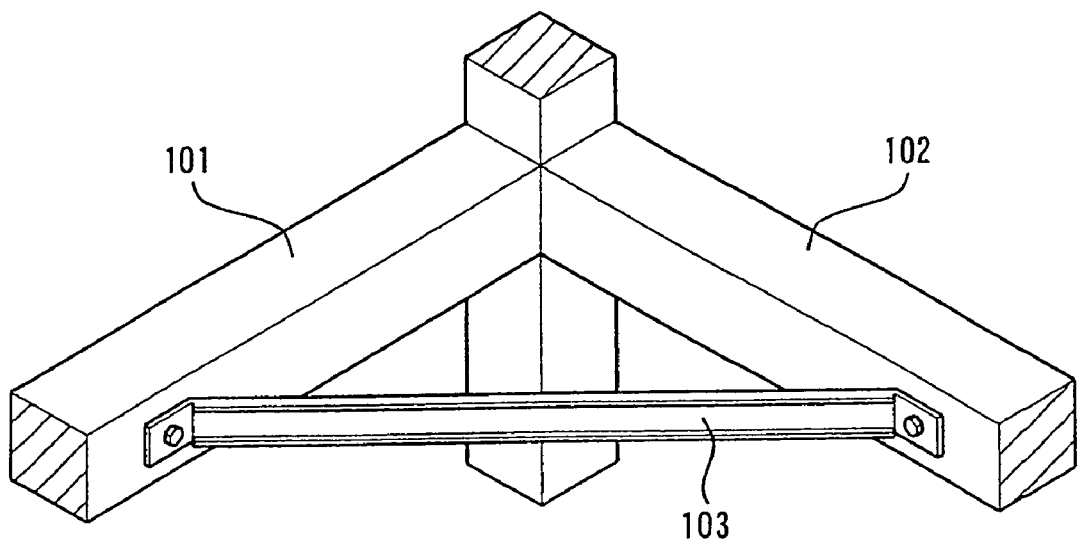
FIG. 10 is a perspective view showing a conventional reinforcing structure for buildings.

The present invention is not restricted to cases where the reinforcing member 1 is bridged over and established in a corner between a structural member which is vertically positioned and a structural member which is horizontally positioned. For instance, as shown in FIG. 9, the reinforcing member 1 may also bridge over and be established in the corner between a horizontally positioned structural member 15 (beam) and another horizontally positioned structural member 16 (beam) which form a 90° corner.

If the reinforcing member 1 is bridged over and established in a corner between a vertically positioned structural member and a horizontally positioned structural member, energy damping effects can be shown for both vertical and lateral shaking of the building because of vibration, and if the reinforcing member 1 is bridged over and established in a mutual corner between two horizontally positioned structural members, energy damping effect can be shown for lateral shaking of the building because of vibration.

Generally, the corners of structural members in buildings are at 90°, but the reinforcing structure of the present invention is not applicable only when the aforementioned corners are at 90° angles, and are similarly applicable for corners of any arbitrary degree.

The present invention can be formed by attaching the reinforcing member 1 between a structural member 11 and a structural member 12, and then covering with a mesh like material from the outer surface side including structural members 11, 12, and then impregnating the material to form a single piece. Furthermore, when the reinforcing member 1 is attached to structural members such as posts and beams or the like in steel reinforced or steel framed buildings, a reinforcing steel plate is preferably attached to the structural members. In this case, a bolt unit can be attached to the reinforcing steel plate.

The effect of the present invention will be described below.

When the building receives vibrational energy from an earthquake or from traffic vibration or the like, in some cases a compressive force is applied between the structural members 11, 12 in a direction which makes the intersecting angle between the structural members 11, 12 smaller than 90°, and conversely, in some cases a tensile force is applied between the structural members 11, 12 in a direction which makes the intersecting angle between the structural members 11, 12 larger than 90°.

If a compressive force in the direction which makes the intersecting angle between the structural members 11, 12 smaller than 90° is applied between the structural members 11, 12, the interval between the third leaf 33 and the leaf spring 5 in the reinforcing member 1 will spread, and the vibrational energy will be damped by this effect.

Furthermore, if a tensile force in a direction which makes the intersecting angle between the structural members 11, 12 larger than 90° is applied between the structural members 11, 12, the interval between the third leaf 33 and the leaf spring 5 in the reinforcing member 1 will become narrower, and the vibrational energy will be damped by this effect.

The effect on the reinforcing structure of establishing a synthetic resin foam in a space formed between the structural members 11, 12 and the reinforcing member 1, and establishing the synthetic resin foam and the damper member between the plate springs of the reinforcing member 1, will be described based on FIG. 1.

In FIG. 1, when a compressive force in the direction which makes the intersecting angle between the structural members 11, 12 smaller than 90° is applied between the structural members 11, 12, the first leaf 31 and the second leaf 32 in the reinforcing member 1 will receive a force in the direction to curve towards the outside (direction opposite to the direction of the third leaf 33), and will press on the synthetic resin foam 2b. Furthermore, along with the first leaf 31 and a second leaf 32 curving to the outside, the interval between the third leaf 33 and the leaf spring 5 will increase and therefore the damper member 4 will receive a force in the direction of elongation.

The synthetic resin foam 2b will receive a compressive force from the leaf spring 5 and will elastically deform, the compressive force will be absorbed by this elastic deformation, and the vibrational energy will be damped. Furthermore, the force in the direction bending the leaf spring 5 to the outside will be absorbed by the elongation of the damper member 4. Namely, the damper member 4 resists the expansion of the space between the first spring member and the second spring member, the synthetic resin foam 2b abovementioned resists the compressive force from the second spring and resists the force in the direction which makes the contact angle of the structural members 11, 12 smaller than 90°. Thus, ee the vibrational energy will be damped by the action of this damper member 4.

Furthermore, when the leaf spring 5 curves towards the outside, sliding will occur between the mutually contacting surfaces of the first leaf 31 and the second leaf 32, and also between the mutually contacting surfaces of the first leaf 31 and the retainer 53 and the forces in the direction of sliding will be suppressed by the force of friction created by this sliding, and therefore the vibrational energy will be damped. Furthermore, sliding friction resistance material 57, 58 is provided on the aforementioned mutually contacting surfaces so the vibrational energy dampening effect can be further increased by the action of the friction resistance material 57, 58.

In this manner, the vibrational energy will be damped by the effect of the plate springs (third leaf 33, leaf spring 5) in the reinforcing member 1, the effect of the damper member 4, the effect of the retainer 53, and the effect of the synthetic resin foam 2b.

Furthermore, if a tensile force in the direction which makes the angle of intersection between the structural members 11, 12 larger than 90° is applied between structural members 11, 12, the reinforcing member 1 will receive a tensile force in the longitudinal direction so the interval between the third leaf 33 and the leaf spring 5 will become narrower and the damper member 4 and the synthetic resin foam 2a will be compressed. The damper member 4 will be compressed by these compressive forces, and the synthetic resin foam 2a will elastically deform.

The interval between the third leaf 33 and the leaf spring 5 will absorb the force in the narrowing direction by the compression of the damping material 4, and thereby the vibrational energy will be damped. Furthermore, the interval between the third leaf 33 and the leaf spring 5 will similarly absorb the forces in the direction of narrowing by the elastic deformation of the synthetic resin foam 2a. Namely, the damper 4 and the synthetic resin foam 2a resist the narrowing of the space between the first spring member and the second spring member. Thus, the vibrational energy will be damped.

Furthermore, when a force is received in the direction that the interval between the third leaf 33 and the leaf spring 5 is made narrower and the leaf spring 5 is under tension to deform in the direction towards the third leaf 33, sliding will occur at the mutually contacting surfaces of the first leaf 31 and the second leaf 32, and at the mutually contacting surfaces of the first leaf 31 and the retainer 53, and forces in the direction of sliding will be suppressed by the force of friction caused by this sliding, and thereby the vibrational energy will be damped. Furthermore, sliding friction resistance material 57, 58 is established on the aforementioned mutually contacting surfaces, and the vibrational energy dampening effect will be further increased by the effect of the friction resistance materials 57, 58.

In this manner, the vibrational energy will be damped by the effect of the plate springs (third leaf 33, leaf spring 5) of the reinforcing member 1, the effect of the damping material 4, the effect of the synthetic resin foam 2a, and the effect of the retainer 53.

With the reinforcing structures of the other embodiments shown in FIG. 2 through FIG. 5, effects similar to the aforementioned will be obtained with or without the effect of the damper member 4 and with or without the effect of the leaf spring 5.

The building reinforcing structure of the present invention can be applied to structural members such as steel frames, concrete posts, and concrete beams or the like in steel frame buildings and steel reinforced steel frame buildings, to structural members such as posts, studs, ground sills, beams, and girths or the like in wooden post and frame buildings, and to structural members such as lumber in wooden frame construction buildings.

INDUSTRIAL APPLICABILITY

Applying the building reinforcing structure and the reinforcing member of the present invention is extremely useful for strengthening the anti-vibration properties and quake resistance of a building.

The invention claimed is:

1. A building reinforcing structure comprising:
   first and second structural members for a building connected to each other,
   a reinforcing member extending between the first and second structural members and fixed to the first and second structure members to form a first space surrounded by the first and second structure members connected to each other and the reinforcing member, said reinforcing member including a first spring member protruding to a direction opposite to a contacting portion between the first and second structural members and a second spring member protruding toward the contacting portion, said first and second spring members forming a second space therebetween,
   a damper member and a first synthetic resin foam provided in the second space between the first and second spring members, wherein said damper member is arranged to resist against a force enlarging the second space between the first and second spring members due to a force acting on the first and second structural members to reduce an angle at the contacting portion between the first and second structural members, and said damper member and said first synthetic resin foam are arranged to resist against a pulling force reducing the second space between the first and second spring members due to a force acting on the first and second structural members to enlarge the angle between the first and second structural members, and
   a second synthetic resin foam provided in the first space enclosed by the first and second structural members and the reinforcing member, wherein said second synthetic resin foam resists a pushing force from the second spring member, and a pushing force acting on the first and second structural members to reduce the angle at the contacting portion between the first and second structural members.

2. The building reinforcing structure according to claim 1, wherein the first spring member is formed by a first plate spring, and the second spring member is formed by second and third plate springs overlapping each other and joined with retainers.

3. The building reinforcing structure according to claim 2, wherein said second plate spring is fixed at two longitudinal end portions to the first and second structural members, and the first plate spring is immovably connected at two longitudinal end portions only to the second plate spring without connecting to the first and second structural members.

4. The building reinforcing structure according to claim 1, wherein said damper member is a spring installed between the first and second spring members to contact thereto.

5. The building reinforcing structure according to claim 4, wherein said damper member and the first synthetic resin foam are provided in the second space.

6. The building reinforcing structure according to claim 1, wherein said first and second structural members contact or cross to each other.

* * * * *